United States Patent [19]

Arav

[11] Patent Number: 4,671,546
[45] Date of Patent: Jun. 9, 1987

[54] SEALING DEVICE FOR SECURING DEVICE EXTENDING THROUGH FLUID CONTAINER

[75] Inventor: Ronnie A. Arav, Bolton, United Kingdom

[73] Assignee: Beloit Corp., Beloit, Wis.

[21] Appl. No.: 852,452

[22] PCT Filed: Jan. 31, 1986

[86] PCT No.: PCT/US86/00218

§ 371 Date: Apr. 7, 1986

§ 102(e) Date: Apr. 7, 1986

[30] Foreign Application Priority Data

Feb. 14, 1985 [GB] United Kingdom ............... 8503731

[51] Int. Cl.$^4$ ............................................. F16L 23/02
[52] U.S. Cl. ................................... 285/368; 285/347; 285/342; 285/918; 411/542; 277/190; 277/193; 277/198; 220/327
[58] Field of Search .............. 285/368, 347, 363, 342, 285/343, 918; 411/542; 277/190, 193, 195, 198; 220/327

[56] References Cited

U.S. PATENT DOCUMENTS

| 2,353,549 | 7/1944 | Dalzell et al. | 285/918 X |
| 2,394,097 | 2/1946 | Parker | 285/918 X |
| 2,752,814 | 7/1956 | Iaia | 411/542 |
| 3,043,470 | 7/1962 | Puxkanol | 220/327 X |
| 4,056,144 | 11/1977 | Wellstein | 285/918 X |

Primary Examiner—Richard J. Scanlan, Jr.
Attorney, Agent, or Firm—Dirk J. Veneman; Raymond W. Campbell; David J. Archer

[57] ABSTRACT

A sealing device is disclosed for sealing a securing device (17) which extends through adjacent flanges (7,9) of a shell (1) and of a head (3) of a fluid container. The sealing device includes an O-ring seal (23) which slidingly engages the securing device (17) for sealing the securing device relative to the flange (9) of the head. A carrier member (25) through which the securing device extends is urged towards the flange (9) of the head such that the O-ring seal (23) is urged into sealing engagement between the securing device (17) and the flange (9) of the head. The carrier member (25) defines a conical recess (35) for reception therein of the O-ring seal (23) such that when the carrier member (25) is urged towards the flange (9) of the head, the O-ring seal (23) is distorted by reaction between the carrier member (25), the securing device (17) and the flange (9) of the head so the securing device (17) and the flange (9) of the head are sealed relative to each other.

8 Claims, 3 Drawing Figures

SUBSTITUTE SHEET

SEALING DEVICE FOR SECURING DEVICE EXTENDING THROUGH FLUID CONTAINER

DESCRIPTION

The present invention relates to a means for sealing a bolt hole in a fluid containing assembly.

There are many applications in industry where a bolted connection has to be effected between two parts and where this connection has to be sealed. One, for instance, is in the large diameter (typically 8 to 20 foot diameter) pressure vessel used as a dryer in paper-making installations, known within the paper trade as "Yankee Dryers" or 'M. G. Cylinders". In such arrangements steam is introduced under pressure into the drying cylinder as a heat source whilst condensate is drawn out. Wet paper contacting the hot outside surface of the cylinder has some of its water content evaporated by the dryer. All such dryers, and other similar types of apparatus, suffer from the problem of steam leaking from the holes accommodating securing bolts used in assembling the dryer. For example, a pressure vessel such as the dryer of a paper-making machine installation has bolts passing through holes from the inside of a fluid chamber to the outside in order to secure a head to a shell of the dryer. Even if a gasket is used in the joint between the head and the shell, a lead can occur through the bolt hole.

In the past, the through hole has been sealed by the provision of an internal gasket locted around the bolt shank and disposed between the bolt head or nut and the shell i.e. within the pressure vessel.

Such an arrangement suffers from the disadvantage that if the sealant forming the gasket between the head and the shell should deteriorate, fluid could enter the bolt hole and leak out even through the gasket under the bolt head were intact.

It is an aim of the present invention to solve the aforementioned problem.

According to the present invention there is provided a fluid containing assembly having a through hole passing between the exterior and the interior of the assembly, securing means received in said hole to secure together parts of the assembly, and hole sealing means to prevent fluid leakage out of the assembly from said hole, wherein said hole sealing means is disposed externally of the assembly, surrounding and in abutment with the exterior opening of said hole and in abutment with a shank of said securing means.

According to one embodiment of the invention the hole sealing means comprises an annular seal member which is received in an annular carrier member. The annular carrier member has parallel opposite end faces and an internal bore, the internal bore being counter-bored from one end face to define a recess receiving said annular seal member. Preferably, the annular seal member comprises an O-ring seal. Preferably, the recess is defined by a conical surface and more preferably, the conical surface is bounded by the internal bore and the said one end face.

The conical surface preferably has an apex angle of substantially 90°.

In use, the annular seal member contacts the conical surface of the annular carrier member and is urged into contact with the shank of the securing means and the exterior face of the assembly. The said one end face of the annular carrier member is also preferably urged into abutment with said exterior face of the assembly outwardly of the seal member. The dimension of the annular seal member in cross-section is such that it cannot be freely received within the recess in the annular carrier member, i.e. distortion is necessary, and this distortion ensures abutment with the shank and the exterior of the assembly.

Preferably, the securing means comprises a nut and a bolt, with the head of the bolt located internally, and the nut located externally. The annular carrier member is received under the nut and serves as a washer. The bolt and annular carrier member are so dimensioned that the annular seal member seats on the shank portion of the bolt. Preferably, the internal diameter of the annular seal member is slightly larger than the external diameter of the bolt threads to avoid damage to the seal on fitting over the threaded section of the bolt.

It will be appreciated that the use of a bolt and nut could be replaced by any alternative mechanical equivalent.

The present invention will now be described, by way of example only, with reference to the accompanying drawings, in which.

Figure 1:
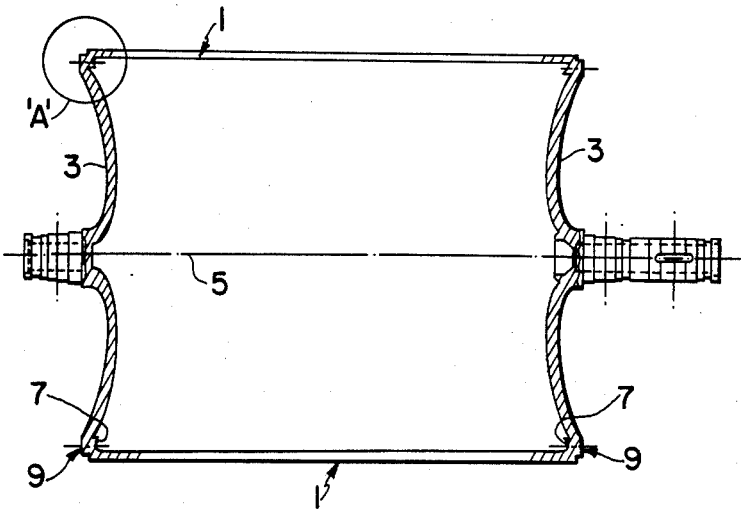
FIG. 1 is a cross-sectional view of a dryer showing one application of the present invention.

Referring to the drawings, FIG. 1 shows a dryer as used in a paper machine. It comprises a shell 1 having a respective head 3 secured to each end to form a fluid container which is journalled for rotation about axis 5. The shell 1 is cylindrical with a respective inturned flange 7 formed at each end. The head 3 has a flange 9 for mating engagement with the inturned flange 7. The respective flanges of the shell and the head 7, 9 have a plurality of circumferentially spaced through bores 11, 13, one of which is shown in more detail in FIG. 2. Thus the bores form a potential source of leakage for fluid from within the assembly. A further source of leakage is the joint between the head and shell flanges and this is sealed using any convenient sealant 15, which may be in the form of a preformed gasket or any other type of sealing compound.

Figure 2:
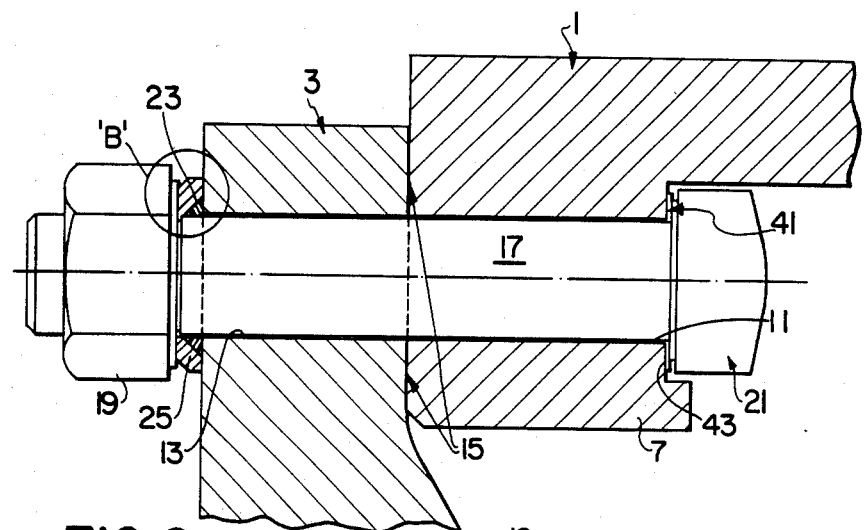
FIG. 2 is a detailed view to an enlarged scale of the encircled portion A of FIG. 1.

In the illustrated embodiment the assembly is held together by means of bolts 17 passing through the respective bores in the shell and head and co-operating nuts 19. One such nut and bolt is illustrated in FIG. 2. The bolt is arranged with its head 21 disposed within the assembly so that the thread and the nut is accessible externally.

In order to prevent fluid within the assembly leaking from each bolt hole, hole sealing means is positioned externally of the assembly in abutment with the exterior opening of each hole and in abutment with the shank of the securing means. The hole sealing means comprises an annular seal member 23 and an annular carrier member 25. The annular carrier member 25 has a recess 27 which receives the seal member 23. As illustrated in FIG. 2, the annular carrier member is interposed between the nut 19 and the exterior of the head flange 9.

Figure 3:
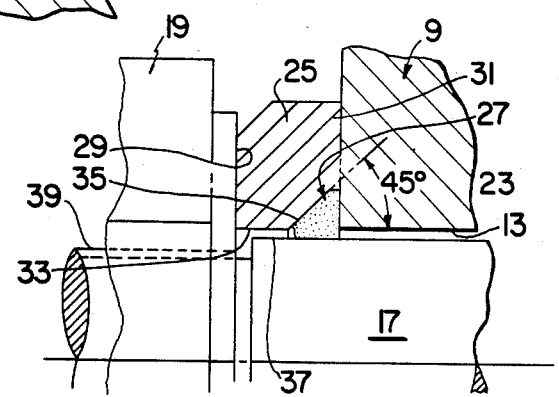
FIG. 3 is a detailed view to an enlarged scale of the encircled portion B of FIG. 2.

The arrangement is shown in greater detail in FIG. 3 from which it will be seen that the annular carrier member has two opposite end faces 29, 31 which are parallel with one another, and an internal bore 33. The annular carrier member has a conical recess 35 in the preferred illustrated embodiment, which is defined by a counter-bore formed in one end face 31 of the annular member. The conical surface is bounded on the one hand by the internal bore 33 and on the other by the end face 31. The end face 31 is arranged to be urged into abutment with the external surface of the head flange 9 when the nut 19 is in contact with the end face 29 of the annular carrier member. Thus, there is metal to metl contact between the nut and the head. Preferably the conical recess has an apex angle of 90°.

The annular seal member 23 comprises an O-ring seal according to the preferred embodiment of the invention. The seal is larger in cross-section than the size of the conical recess in the annular carrier member 25 so that on assembly, the seal member 23 is distorted and urged into contact with the external face of the head and into contact with a shank portion 37 of the bolt 17 by virtue of its contact with the conical recess 35. Thus, the external opening of the hole 13 is sealed. Should the sealant 15 deteriorate between the hole 13 and the interior of the vessel, —no leakage will occur.

It will be seen that the diameter of the shank portion 37 is larger than the external diameter of the threaded portion 39 and this ensures that the O-ring seal is not damaged by the threaded portion on fitting. The O-ring seal has an internal diameter which is larger than the external diameter of the threaded portion 39.

In securing the assembly, the annular seal member 23 and the annular carrier member 25 are fitted onto the end of the bolt shank portion 37 where it protrudes from the assembly. On tightening of the nut 19 against the annular member 25, the O-ring seal is urged into sealing contact with the shank 37 and the exterior face of the assembly. The annular member 25 is urged into contact with the same exterior face.

In certain circumstances it may be required to insert an additional sealing gasket 41 between the head 21 of the bolt 17 and the internal face 43 of the shell flange 7 against which it takes its reaction.

The arrangement has the advantage that the bolt can be fastened from outside the pressure vessel; the thread of the bolt is outside the pressure vessel and so avoids seizure due to corrosion; if an O-ring fails it can be replaced without having to enter inside the pressure vessel; The O-ring is subject to negligible sliding movement during its compression; and once the joint is compressed with metal to metal contact, the force of clamping cannot be released due to O-ring deterioration.

What is claimed is:

1. A device for securing a flange of a head to a shell of a Yankee Dryer, said device comprising in combination:
    a bolt extending through aligned holes defined respectively by the flange and the shell;
    an enlarged portion of said bolt being disposed within the shell;
    a threaded shank portion of said bolt being disposed at the opposite end of said bolt relative to said enlarged portion;
    an O-Ring seal through which said shank portion extends such that said seal slidingly engages said shank portion for sealing said shank portion relative to the flange;
    annular carrier means through which said shank portion extends such that said seal is disposed between said carrier means and the flange so that when said carrier means is moved axially along said shank portion towards said seal, said seal is urged and distorted into sealing engagement between said shank portion and the flange;
    a nut threadably cooperating with said shank portion for urging said carrier means axially towards the flange; and
    said carrier means defining a conical recess for the reception therein of said seal such that when said carrier means is urged by said nut towards the flange, said seal is distorted by reaction between said carrier means, said shank portion and the flange so that said shank portion and the flange are sealed relative to each other.

2. A device as set forth in claim 1 wherein said O-ring seal slides axially along said shank portion.

3. A sealing device as set forth in claim 2 wherein said O-ring seal has a volume which is greater than the volume of said conical recess defined by said carrier means, said shank portion and said flange of the head such that when said carrier means is urged towards the flange of the head, said O-ring seal is distorted and urged within the conical recess for sealing the shank portion and flange of the head relative to each other.

4. A sealing device as set forth in claim 3 wherein said O-ring seal has an internal diameter which is greater than the external diameter of said threaded portion such that when said O-ring seal is fitted over said threaded portion onto said shank portion, damage to said O-ring is inhibited.

5. A device as set forth in claim 1 wherein said annular carrier means is an annular carrier member which defines a first and a second end face, said end faces being spaced and parallel relative to each other, said first end face abutting against the flange of the head;
    said nut being disposed adjacent to said second end faces of said carrier means for urging said carrier means towards the flange of the head.

6. A sealing device as set forth in claim 5 wherein annular carrier means defines an internal bore having a diameter which is greater than the external diameter of said shank portion thereby permitting said annular carrier means to slide axially along said shank portion towards the flange of the head.

7. A sealing device as set forth in claim 1 wherein said conical recess has an apex angle of substantially 90 degrees with the apex of the conical recess being disposed away from the flange of the head in a direction from the flange of the head towards said carrier means and the base of the conical recess being coplanar with the flange of the head such that as said carrier means is urged towards the flange of the head, said sealing means is urged into sealing engagement between the flange of the head and the securing device.

8. A device for securing a flange of a head to a shell of a Yankee Dryer, said device comprising:
    a bolt extending through aligned holes defined respectively by the flange and the shell;
    an enlarged portion of said bolt being disposed within the shell;
    a threaded shank portion of said bolt being disposed at the opposite end of said bolt relative to said enlarged portion;
    an O-ring seal through which said shank portion extends such that said seal slidingly engages said shank portion for sealing said shank portion relative to the flange;
    annular carrier means through which said shank portion extends such that said seal is disposed between said carrier means and the flange so that when said carrier means is moved axially along said shank portion towards said seal, said seal is urged and distorted into sealing engagement between said shank portion and the flange;

a nut threadably cooperating with said shank portion for urging said carrier means axially towards the flange;

said carrier means defining a conical recess for the reception therein of said seal such that when said carrier means is urged by said nut towards the flange, said seal is distorted by reaction between said carrier means, said shank portion and the flange so that said shank portion and the flange are sealed relative to each other; and said carrier means having a first and a second end face, said first end face defining said conical recess for the reception thereon of said O-ring seal such that when said carrier means is urged along said shank portion towards the flange, said O-ring seal is distorted by reaction between said carrier means, said shank portion and the flange of the head so that said shank portion and the flange are sealed relative to each other to inhibit any leakage that may be occasioned by seepage of a fluid from within the shell past said O-ring seal.

* * * * *